United States Patent
Wasserman

(10) Patent No.: US 9,746,033 B2
(45) Date of Patent: Aug. 29, 2017

(54) ECCENTRICALLY BORED SLEEVE FOR LOCATING A BEARING

(71) Applicant: United Technologies Corporation, Hartford, CT (US)

(72) Inventor: David J. Wasserman, Hamden, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 14/775,454

(22) PCT Filed: Mar. 14, 2014

(86) PCT No.: PCT/US2014/027115
§ 371 (c)(1),
(2) Date: Sep. 11, 2015

(87) PCT Pub. No.: WO2014/152244
PCT Pub. Date: Sep. 25, 2014

(65) Prior Publication Data
US 2016/0025142 A1      Jan. 28, 2016

Related U.S. Application Data

(60) Provisional application No. 61/783,483, filed on Mar. 14, 2013.

(51) Int. Cl.
*F16C 35/06* (2006.01)
*F01D 25/16* (2006.01)
(Continued)

(52) U.S. Cl.
CPC ............ *F16C 35/063* (2013.01); *F01D 25/16* (2013.01); *F01D 25/162* (2013.01); *F16C 19/06* (2013.01); *F16C 35/067* (2013.01); *F05D 2240/50* (2013.01); *F05D 2250/312* (2013.01); *F05D 2250/36* (2013.01); *F16C 19/04* (2013.01); *F16C 2360/23* (2013.01)

(58) Field of Classification Search
CPC ........ F16C 19/04; F16C 19/06; F16C 35/063; F16C 35/067; F16C 19/225; F16C 19/26;
(Continued)

(56) References Cited

U.S. PATENT DOCUMENTS 2,246,275 A * 6/1941 Davidson .............. F04C 15/008
                                                310/67 R
2,951,631 A * 9/1960 Gregory .................... F02C 7/32
                                                415/122.1
(Continued)

FOREIGN PATENT DOCUMENTS

DE         3510250 A1 * 10/1985 .............. B21J 9/025
JP         06050345 A  *  2/1994
WO         2009098841       8/2009

Primary Examiner — Marcus Charles
(74) Attorney, Agent, or Firm — O'Shea Getz P.C.

(57) ABSTRACT

A bearing assembly includes a sleeve and a bearing located within a bore of the sleeve. The sleeve extends between an inner surface and an outer surface. The inner surface at least partially defines the bore, which extends through the sleeve. The inner surface is configured eccentric to the outer surface. The bearing includes a plurality of rolling elements arranged between an inner ring and an outer ring. The outer ring is mounted to the sleeve.

14 Claims, 3 Drawing Sheets

(51) Int. Cl.
*F16C 19/06* (2006.01)
*F16C 23/10* (2006.01)
*F16C 35/063* (2006.01)
*F16C 35/067* (2006.01)
*F16C 19/04* (2006.01)

(58) Field of Classification Search
CPC ...... F16C 19/361; F16C 33/583; F16C 23/10; F01D 25/16; F01D 25/162; F01D 5/26; F05D 2240/50; F05D 2250/36; F05D 2250/312
USPC ....... 384/447, 456, 481, 519, 549, 565, 586, 384/548
See application file for complete search history.

(56) References Cited

U.S. PATENT DOCUMENTS

| | | | |
|---|---|---|---|
| 4,306,755 A * | 12/1981 | Roberts | F01D 5/026 384/494 |
| 4,463,994 A | 8/1984 | Eliason et al. | |
| 5,311,817 A * | 5/1994 | Funada | B41F 13/28 101/177 |
| 5,533,374 A * | 7/1996 | Seto | B21B 27/028 492/1 |
| 5,842,405 A * | 12/1998 | Schaefer | F04B 1/0413 417/273 |
| 6,491,497 B1 * | 12/2002 | Allmon | F01D 21/045 384/495 |
| 6,511,228 B2 | 1/2003 | Dusza | |
| 8,065,867 B2 * | 11/2011 | McCutchan | F16C 19/163 384/499 |
| 8,646,985 B2 | 2/2014 | Docimo | |
| 2003/0167942 A1 * | 9/2003 | Kobayashi | B41F 13/28 101/216 |
| 2004/0011545 A1 * | 1/2004 | Wuensch | B24B 23/04 173/217 |
| 2004/0141675 A1 | 7/2004 | Kapaan et al. | |
| 2011/0009220 A1 * | 1/2011 | Arnault | B29C 45/1459 474/166 |

* cited by examiner

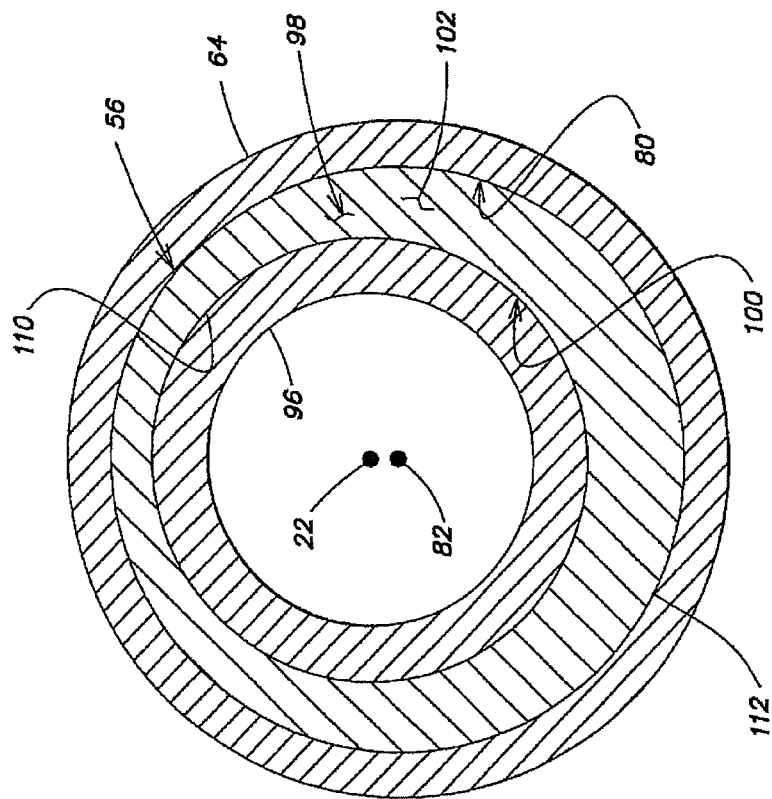
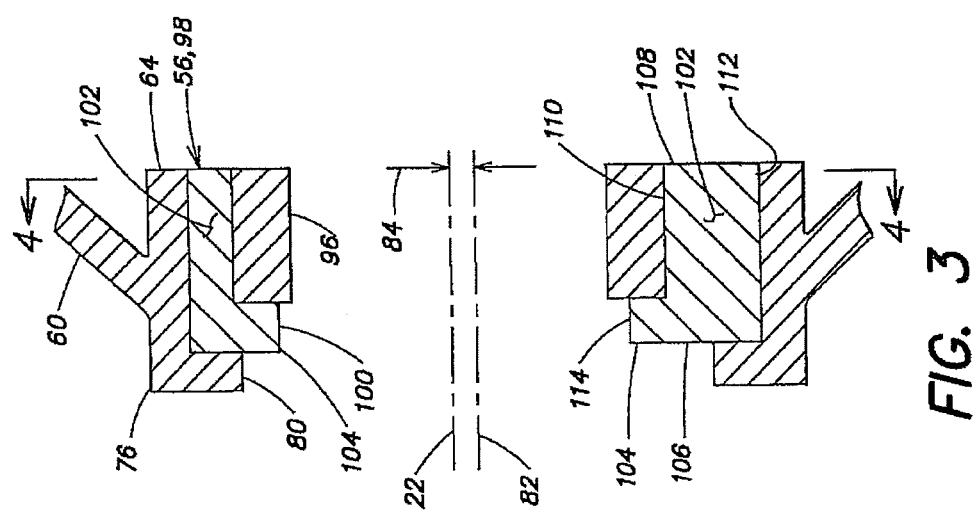

ECCENTRICALLY BORED SLEEVE FOR LOCATING A BEARING

CROSS-REFERENCE TO RELATED APPLICATIONS

This application claims priority to PCT Patent Appln. No. PCT/US14/27115 filed Mar. 14, 2014, which claims priority to U.S. Patent Appln. No. 61/783,483 filed Mar. 14, 2013, which are hereby incorporated herein by reference in their entireties.

BACKGROUND OF THE INVENTION

1. Technical Field

This disclosure relates generally to rotational equipment and, more particularly, to a device for locating a bearing within, for example, a turbine engine.

2. Background Information

A turbine engine typically includes a plurality of bearings that rotatably connect a shaft to an engine case. A first of the bearings may be connected to the engine case by a bearing housing and a plurality of tie rods. This first bearing is seated within the bearing housing. The tie rods are arranged circumferentially around a centerline of the shaft, and connect the bearing housing to the engine case. Effective lengths of the tie rods may be adjusted to change a location of the first bearing relative to another bearing supporting the shaft. The tie rods, for example, may be adjusted such that the first bearing is configured concentric with the other bearing supporting the shaft. Implementing such a tie rod arrangement, however, may be difficult within a relatively small turbine engine where there may be little or no room to accommodate tie rods between the engine case and the bearing housing.

There is a need in the art for an improved device for locating a bearing.

SUMMARY OF THE DISCLOSURE

According to an aspect of the invention, a bearing assembly is provided that includes a sleeve and a bearing located within a bore of the sleeve. The sleeve extends between an inner surface and an outer surface. The inner surface at least partially defines the bore, which extends through the sleeve. The inner surface is configured eccentric to the outer surface. The bearing includes a plurality of rolling elements that are arranged between an inner ring and an outer ring. The outer ring is mounted to the sleeve.

According to another aspect of the invention, an assembly is provided for a turbine engine. The assembly includes a shaft, a housing, a bearing and a sleeve. The shaft extends along and is rotatable about a first centerline. The housing includes a housing bore that extends along a second centerline through the housing. This second centerline is substantially parallel with the first centerline. The bearing is mounted on the shaft. The sleeve is within the housing bore. The sleeve is arranged between and engaged with the shaft and the housing.

According to still another aspect of the invention, another assembly is provided for a turbine engine. The assembly includes a housing, a sleeve, a shaft and a bearing. The housing includes a housing bore that extends through the housing. The sleeve is within the housing bore, and extends between an inner surface and an outer surface. The inner surface at least partially defines a sleeve bore that extends through the sleeve. The inner surface is configured eccentric to the outer surface. The shaft extends through the sleeve bore. The bearing is arranged between and mounted to the sleeve and the shaft.

The sleeve may extend between an inner surface and an outer surface. The inner surface may at least partially define a sleeve bore, which extends through the sleeve. The inner surface may be configured eccentric to the outer surface. The bearing may be located within the sleeve bore.

The bearing may be configured as a rolling element bearing. The bearing may include a plurality of rolling elements arranged between an inner ring and an outer ring. The outer ring may be mounted to the sleeve. The bearing may also or alternatively be configured as or otherwise include a cylindrical rolling bearing.

The inner surface may have and/or extend circumferentially around a first centerline. The outer surface may have and/or extend circumferentially around a second centerline. The second centerline may be substantially parallel with and/or offset from the first centerline.

The sleeve may include a base and a flange. The base may extend between the inner surface and the outer surface. The flange may extend inwards from the base. The flange may also or alternatively be adjacent the inner surface.

The outer ring may engage the sleeve. For example, the outer ring may contact the inner surface. The outer ring may also or alternatively be press fit into the sleeve.

The assembly may include an engine case and at least one strut. The strut may connect the housing to the engine case.

The foregoing features and the operation of the invention will become more apparent in light of the following description and the accompanying drawings.

BRIEF DESCRIPTION OF THE DRAWINGS

FIG. 3 is a side sectional illustration of a portion of the assembly of FIG. 2;
and
FIG. 4 is a cross-sectional illustration of the portion of the assembly of FIG. 3.

DETAILED DESCRIPTION OF THE INVENTION

Figure 1:
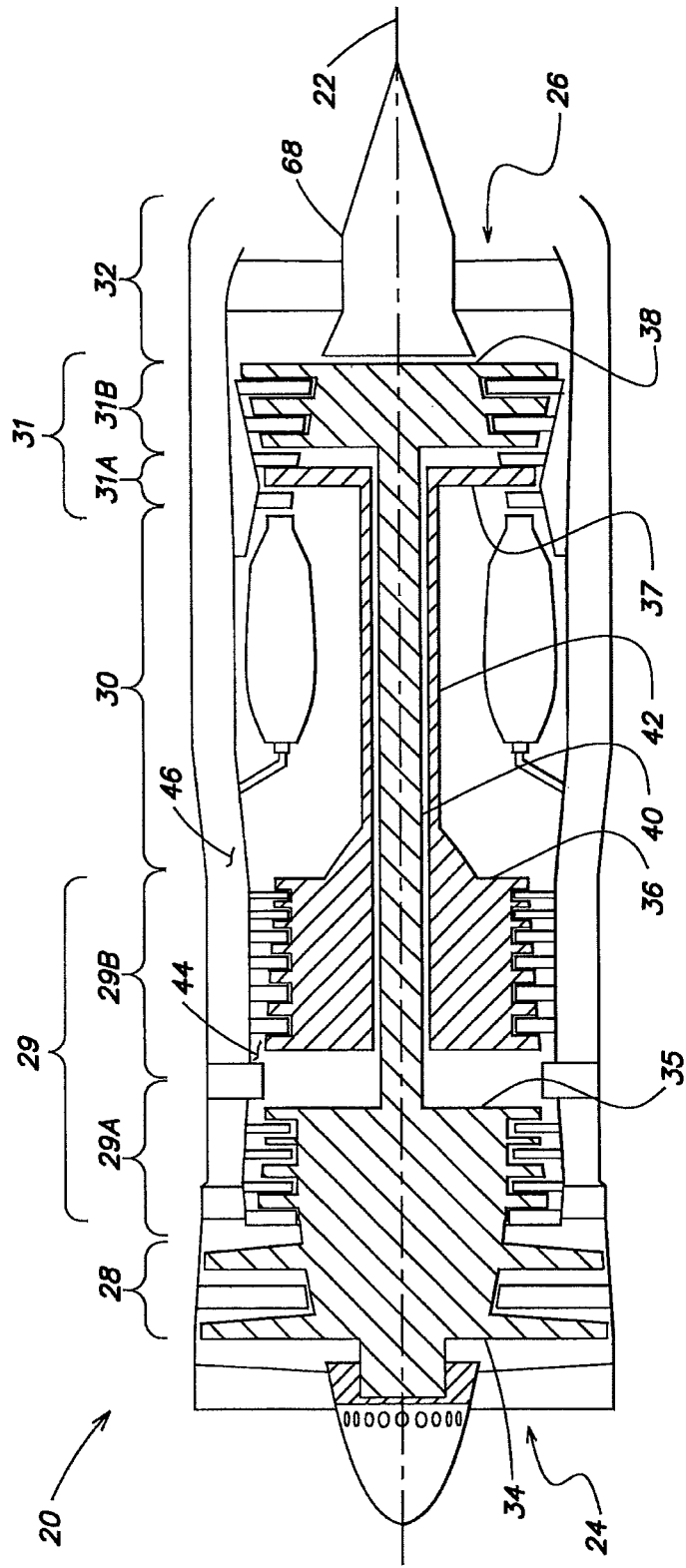
FIG. 1 is a side sectional illustration of a turbine engine.

FIG. 1 is a side sectional illustration of a turbine engine 20. The turbine engine 20 extends along an axial centerline 22 between an upstream airflow inlet 24 and a downstream airflow exhaust 26. The turbine engine 20 includes a fan section 28, a compressor section 29, a combustor section 30, a turbine section 31 and an exhaust section 32, which are arranged sequentially along the centerline 22. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

Each of the engine sections 28, 29A, 29B, 31A and 31B respectively includes a rotor 34-38. Each of the rotors 34-38 includes a plurality of rotor blades arranged circumferentially around and connected to (e.g., formed integral with or attached to) one or more respective rotor disks. The fan rotor 34 and the LPC rotor 35 are connected to and driven by the LPT rotor 38 through a first engine shaft 40 (e.g., a low speed shaft). The HPC rotor 36 is connected to and driven by the HPT rotor 37 through a second engine shaft 42 (e.g., a high speed shaft). These engine shafts 40 and 42 extend along and are rotatable about the centerline 22.

Air enters the turbine engine 20 through the airflow inlet 24, and is directed through the fan section 28 and into an annular core gas path 44 and an annular bypass gas path 46. The air within the core gas path 44 may be referred to as "core air". The air within the bypass gas path 46 may be referred to as "bypass air". The core air is directed through the engine sections 29-32 and exits the turbine engine 20 through the airflow exhaust 26. Within the combustor section 30, fuel is injected into and mixed with the core air and ignited to provide forward engine thrust. The bypass air is directed through the bypass gas path 46 and out of the turbine engine 20 to provide additional forward engine thrust, or reverse engine thrust via a thrust reverser (not shown).

Figure 2:
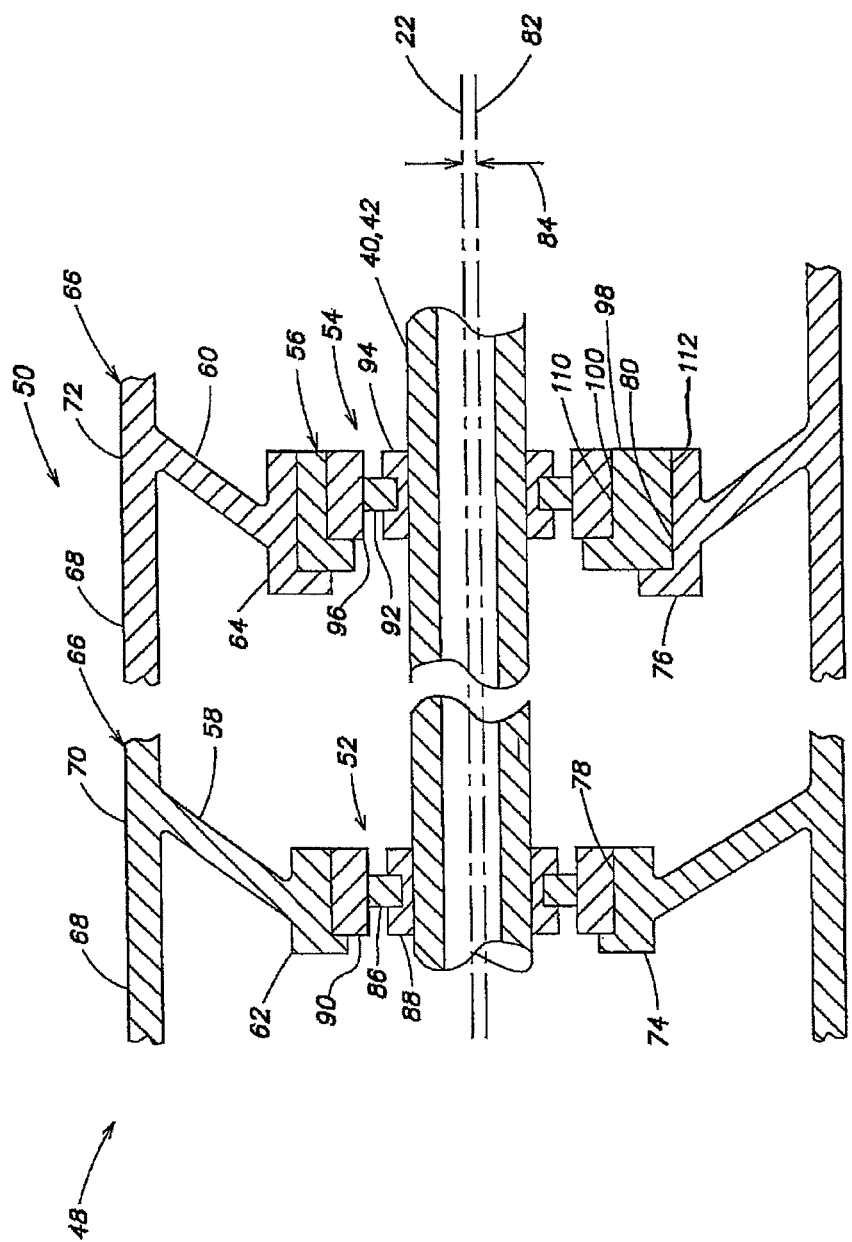
FIG. 2 is a side sectional illustration of a portion of an assembly for the turbine engine of FIG. 1.

FIG. 2 is a side sectional illustration of a portion of an assembly 48 for the turbine engine 20 of FIG. 1. The turbine engine assembly 48 includes one of the engine shafts 40, 42, a stationary support structure 50, and one or more bearings 52 and 54, which rotatably attach the engine shaft 40, 42 to the support structure 50. The assembly 48 also includes an eccentrically bored sleeve 56, which may align the bearing 54 with the bearing 52 along the centerline 22 such that the bearings 52 and 54 are coaxial.

The support structure 50 includes one or more support struts 58 and 60 (e.g., annular support struts) that respectively connect one or more bearing housings 62 and 64 to an engine case 66. The engine case 66 may be configured as an inner wall 68 of the core gas path 44 (see FIG. 1). The engine case 66 includes one or more axial case segments 70 and 72, which may be attached (e.g., mechanically fastened, welded, brazed and/or adhered) together at a joint such as, for example, a bolted flange joint. Alternatively, the case segments 70 and 72 may be connected together through one or more intermediate case segments, or the engine case 66 may be formed as a unitary body.

Each of the housings 62 and 64 respectively includes a tubular body 74, 76 and a housing bore 78, 80. The bore 78 extends through the body 74 along the centerline 22. The bore 80 extends through the body 76 along another centerline 82. This centerline 82 is substantially parallel with the centerline 22 and offset from the centerline 22 by a distance 84. The bore 80 therefore is eccentric to the bore 78. This eccentricity may be a result of a slight radial misalignment between the case segments 70 and 72 and/or manufacturing tolerances.

One or more of the bearings 52 and 54 may each be configured as a rolling element bearing such as, for example, a cylindrical rolling bearing. Alternatively, one or more of the bearings 52 and 54 may each be configured as a ball bearing, a tapered rolling bearing, a spherical rolling bearing, a needle rolling bearing, or any other type of bearing.

The bearing 52 includes a plurality of rolling elements 86, a bearing inner ring 88 and a bearing outer ring 90. The rolling elements 86 are arranged circumferentially around the centerline 22, and radially between the inner ring 88 and the outer ring 90.

The bearing 54 includes a plurality of rolling elements 92, a bearing inner ring 94 and a bearing outer ring 96. The rolling elements 92 are arranged circumferentially around the centerline 22, and radially between the inner ring 94 and the outer ring 96.

Referring to FIGS. 3 and 4, the sleeve 56 includes a tubular body 98 and a sleeve bore 100. The body 98 includes a base 102 and a flange 104. The base 102 extends axially between a sleeve first end 106 and a sleeve second end 108. The base 102 extends radially between a sleeve inner surface 110 (e.g., an inner cylindrical surface) and a sleeve outer surface 112 (e.g., an outer cylindrical surface). The inner surface 110 extends axially and circumferentially around the centerline 22. The outer surface 112 extends axially along and circumferentially around the centerline 82. The outer surface 112 therefore is configured eccentric to the inner surface 110. The flange 104 is located at (e.g., on, adjacent or proximate) the first end 106, and is adjacent to the inner surface 110. The flange 104 extends radially inwards from the base 102 to another sleeve inner surface 114. The bore 100 is defined by the inner surfaces 110 and 114. The bore 100 extends through the body 98 along the centerline 22.

Referring to FIG. 2, the bearing 52 is mounted to the shaft 40, 42 and the housing 62. The inner ring 88 may be press fit onto or otherwise attached to the shaft 40, 42. The outer ring 90 is located within the housing bore 78. The outer ring 90 may be press fit into or otherwise attached to the housing 62.

The bearing 54 is mounted to the shaft 40, 42 and the sleeve 56, which is mounted to the housing 64. The inner ring 94 may be press fit onto or otherwise attached to the shaft 40, 42. The outer ring 96 is located within the sleeve bore 100. The outer ring 96 may be press fit into or otherwise attached to the sleeve 56 such that the outer ring 96 engages (e.g., contacts) the inner surface 110. The sleeve 56 is located within the housing bore 80. The sleeve 56 may be press fit into or otherwise attached to the housing 64 such that the housing 64 engages the outer surface 112.

As described above, the housing bore 80 may be eccentric to the housing bore 78. The sleeve 56 may accommodate such an eccentricity between the housing bores 78 and 80 since the inner surface 110 may be configured proportionally eccentric to the outer surface 112. The sleeve 56 therefore may concentrically align the bearing 54 with the bearing 52 along the centerline 22.

During assembly, the offset distance 84 between the centerline 22 of the housing 62 and the centerline 82 of the housing 64 may be measured before the sleeve 56 is mounted to the support structure 50. This measured offset distance 84 may be used to thereafter machine the sleeve bore 100 into the body 98 such that the sleeve bore 100 will be concentric with the housing bore 78 when the sleeve 56 is mounted to the support structure 50. Alternatively, the measured offset distance 84 may be used to select the sleeve 56 from a plurality of prefabricated sleeves with different eccentricities between their inner and outer surfaces. The sleeve 56 may be position adjacent the housing 64 and rotated about the centerline 82 until the sleeve bore 100 is concentric with housing bore 78. The sleeve 56 may subsequently be press fit into the housing 64.

In some embodiments, the bearing 52 may be replaced with a bearing assembly that includes another bearing and another eccentrically bored sleeve. In such an embodiment, the shaft 40, 42 may be located within the support structure 50 along a centerline, which is offset from the centerlines of both housings 62 and 64.

In some embodiments, the bearing 54 and the sleeve 56 may be axially aligned with the exhaust section 32. In other embodiments, the bearing 54 and the sleeve 56 may be axially aligned with one of the engine sections 28-31.

The sleeve 56 may have various configurations other than those described above and illustrated in the drawings. For example, the sleeve 56 may be configured without the flange 104. In such an embodiment, the housing 64 and/or the base 102 may each include a feature (e.g., a key or keyhole) for axially retaining the sleeve 56 relative to the housing 64. Alternatively, the sleeve 56 may be bonded (e.g., welded, brazed and/or adhered) to the housing 64. In another example, the flange 104 may be located at the sleeve second end 108 rather than the sleeve first end 106. The present invention therefore is not limited to any particular sleeve configurations.

The assembly 48 may be included in various turbine engines other than the one described above as well as in other types of rotational equipment. The assembly 48, for example, may be included in a geared turbine engine where a gear train connects one or more shafts to one or more rotors in a fan section, a compressor section and/or any other engine section. Alternatively, the assembly 48 may be included in a turbine engine configured without a gear train. The assembly 48 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
   a shaft extending along and rotatable about a first centerline;
   a housing including a housing bore that extends along a second centerline through the housing, wherein the second centerline is substantially parallel with the first centerline;
   a bearing mounted on the shaft;
   a sleeve within the housing bore, the sleeve arranged between and engaged with the bearing and the housing; and
   a turbine engine rotor comprising a plurality of rotor blade, wherein the turbine engine rotor is coupled to the shaft.

2. The assembly of claim 1, wherein
   the sleeve extends between an inner surface and an outer surface;
   the inner surface at least partially defines a sleeve bore that extends through the sleeve;
   the inner surface is configured eccentric to the outer surface; and
   the bearing is within the sleeve bore.

3. The assembly of claim 2, wherein
   the inner surface extends circumferentially around the first centerline; and
   the outer surface extends circumferentially around the second centerline.

4. The assembly of claim 2, wherein
   the sleeve includes a base and a flange;
   the base extends between the inner surface and the outer surface; and
   the flange extends inwards from the base, and is adjacent the inner surface.

5. The assembly of claim 1, wherein the bearing includes
   an inner ring;
   an outer ring mounted to the sleeve; and
   a plurality of rolling elements arranged between the inner ring and the outer ring.

6. The assembly of claim 5, wherein the outer ring engages the sleeve.

7. The assembly of claim 5, wherein the outer ring is press fit into the sleeve.

8. The assembly of claim 5, wherein the rolling element bearing comprises a cylindrical rolling bearing.

9. The assembly of claim 1, further comprising:
   an engine case; and
   a strut connecting the housing to the engine case.

10. An assembly for a turbine engine, comprising:
    a housing including a housing bore that extends through the housing;
    a sleeve within the housing bore, the sleeve comprising and extending between an inner surface and an outer surface, wherein the inner surface at least partially defines a sleeve bore that extends through the sleeve, and the inner surface is configured eccentric to the outer surface;
    a shaft extending through the sleeve bore;
    a bearing arranged between and mounted to the sleeve and the shaft; and
    a turbine engine rotor comprising a plurality of rotor blade, the turbine engine rotor coupled to the shaft.

11. The assembly of claim 10, wherein
    the inner surface extends circumferentially around a first centerline; and
    the outer surface extends circumferentially around a second centerline that is substantially parallel with the first centerline.

12. The assembly of claim 10, wherein
    the sleeve includes a base and a flange;
    the base extends between the inner surface and the outer surface; and
    the flange extends inwards from the base, and is adjacent the inner surface.

13. The assembly of claim 10, wherein the bearing includes
    an inner ring;
    an outer ring mounted to the sleeve; and
    a plurality of rolling elements arranged between the inner ring and the outer ring.

14. The assembly of claim 13, wherein the outer ring is press fit into the sleeve.

* * * * *